US012083614B2

(12) United States Patent
Gustafsson et al.

(10) Patent No.: US 12,083,614 B2
(45) Date of Patent: Sep. 10, 2024

(54) METHOD AND APPARATUS FOR REFURBISHING AN OSCILLATING MULTI-TOOL BLADE

(71) Applicant: SWEALAND HUS & FASADTEKNIK AB, Upplands Väsby (SE)

(72) Inventors: Nicklas Gustafsson, Upplands Väsby (SE); Richard Sundgren, Knivsta (SE)

(73) Assignee: SWEALAND HUS & FASADTEKNIK AB, Upplands Väsby (SE)

( * ) Notice: Subject to any disclaimer, the term of this patent is extended or adjusted under 35 U.S.C. 154(b) by 0 days.

(21) Appl. No.: 18/003,201

(22) PCT Filed: Jun. 28, 2021

(86) PCT No.: PCT/SE2021/050640
§ 371 (c)(1),
(2) Date: Dec. 23, 2022

(87) PCT Pub. No.: WO2022/015215
PCT Pub. Date: Jan. 20, 2022

(65) Prior Publication Data
US 2023/0249270 A1    Aug. 10, 2023

(30) Foreign Application Priority Data

Jul. 15, 2020    (SE) ................................ 2050896-6

(51) Int. Cl.
    *B23D 65/02*    (2006.01)
    *B23D 63/00*    (2006.01)
    *B23D 63/04*    (2006.01)

(52) U.S. Cl.
    CPC ........... *B23D 65/02* (2013.01); *B23D 63/003* (2013.01); *B23D 63/005* (2013.01); *B23D 63/04* (2013.01)

(58) Field of Classification Search
    CPC ...... B23D 65/02; B23D 65/00; B23D 63/003; B23D 63/005; B23D 63/04; B23D 63/02; B23D 63/08
    (Continued)

(56) References Cited

U.S. PATENT DOCUMENTS 1,139,818 A * 5/1915 Smith .................... B23D 63/02
                                                    269/236
1,258,734 A * 3/1918 Andersen ............... B23D 63/02
                                                    76/68
(Continued)

FOREIGN PATENT DOCUMENTS

BE       1017559 A7    12/2008

OTHER PUBLICATIONS

International Search Report for PCT/SE2021/050640 dated Sep. 15, 2021, pp. 1-3.

*Primary Examiner* — Phong H Nguyen
(74) *Attorney, Agent, or Firm* — Pearne & Gordon LLP (57) ABSTRACT

A method and apparatus for refurbishing an oscillating multi-tool blade (10) having a serrated forward end. The blade (10) is clamped to a support surface, a new serrated end is formed by cutting away an edge portion of the serrated end, the blade (10) is moved across a cutting direction so far as tips of teeth (12) of the new serrated end will be cut away during a following renewed cut, and the renewed cut is performed.

14 Claims, 6 Drawing Sheets

(58) Field of Classification Search
USPC .......................... 76/112, 29, 30, 89.1, 101.1
See application file for complete search history.

(56) References Cited

U.S. PATENT DOCUMENTS

| | | | |
|---|---|---|---|
| 1,576,908 A | | 3/1926 | Hartig |
| 2,493,850 A | * | 1/1950 | Blackmon .............. B23D 63/02 |
| | | | 76/79 |
| 4,065,990 A | * | 1/1978 | Edhlund .................. G03F 9/00 |
| | | | 83/590 |

* cited by examiner

METHOD AND APPARATUS FOR REFURBISHING AN OSCILLATING MULTI-TOOL BLADE

FIELD OF INVENTION

This invention relates to a method of refurbishing an oscillating multi-tool blade having a serrated forward end. The invention also relates to an apparatus for performing the method.

BACKGROUND

Depending on application and unintentional misuse, multi-tool blades are sometimes worn out after a relatively short period of use and have to be replaced. This is a waste of resources, and since such blades are also generally quite expensive, it would be convenient to have them refurbished.

DISCLOSURE OF THE INVENTION

An object of the invention is to provide a method and an apparatus capable of refurbishing a worn multi-tool blade to a good working condition characterized by having sharp teeth.

In one aspect of the invention the method comprises clamping the blade to a support surface, cutting a new serrated end by cutting away an edge portion of the serrated end, moving the blade across a cutting direction so far as tips of the teeth of the new serrated end will be cut away during a following renewed cut, and performing the renewed cut.

By cutting away the edge portion in two steps and moving the blade laterally between the steps, where the blade may be clamped during this movement, the tips of the resulting teeth will be very sharp as these tips are then not shaped by inevitably rounded tips of the cutting tool but shaped in two occasions by intersecting straight edges of the cutting tool.

The cutting may be performed by shearing. Shearing will be relatively easy to accomplish by using a punch and a die with serrated cutting edges.

The shearing process may in turn be accomplished by rotation of the punch past the die. Such rotational movement of the cutting tool is straightforward by not needing any complicated tool-guiding surfaces but only a single pivot joint.

The cutting may be actuated by an eccentric rotating shaft engaging the punch.

The eccentric rotating shaft may in turn engage the punch via a rolling bearing. Thereby there will be no frictional movement between the eccentric shaft and the punch.

A cutting apparatus according to the invention comprises a clamping mechanism including clamping and support members for clamping the blade therebetween, cutting tooling for cutting a new serrated end by cutting away an edge portion of the serrated forward end, and a mechanism for moving the clamping and support members and the blade clamped therebetween across a cutting direction so far as tips of teeth of the new serrated end will be cut away during a following renewed cut.

The cutting apparatus may also have a teeth setting device incorporated therein.

The teeth setting device may comprise blocks having teeth faces facing the blade and alternatively sloping upward and downward for bending the blade teeth correspondingly on operation by clamping the blocks together.

An eccentric rotating shaft portion used for performing the cutting may also be used for clamping the teeth setting blocks together. Thereby the setting device can make common use of components designated for cutting of the blade.

Other features and advantages of the invention may be apparent from the annexed claims and the following detailed description.

BRIEF DESCRIPTION OF THE DRAWINGS

In the drawings, different components having similar or like functions may be designated by same numerals.

DETAILED DESCRIPTION OF EMBODIMENTS

Figure 1:
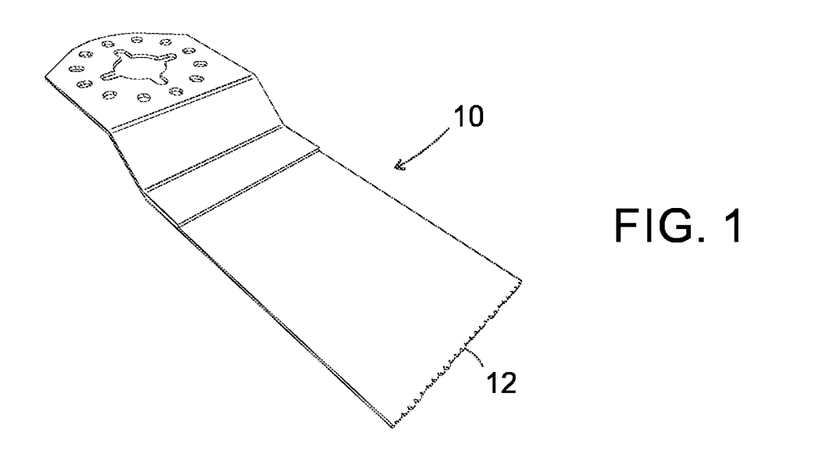
FIG. 1 is a perspective view of a worn multi-tool blade that may be refurbished according to the invention.

The blade 10 shown in FIG. 1 is of the common type used in oscillating multi-tools where a serrated working end has worn teeth 12.

Figure 3:
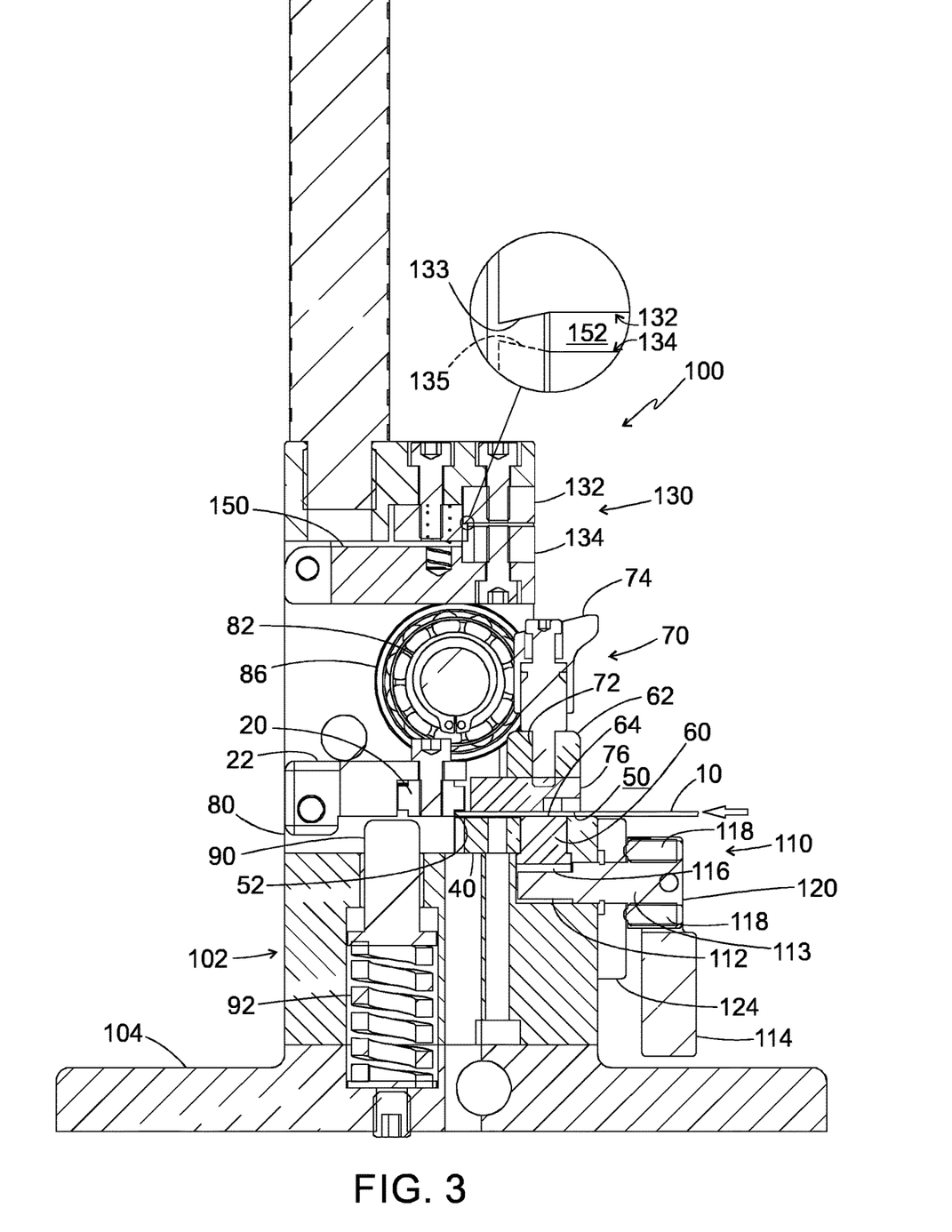
FIG. 3 is a lateral section view of the apparatus shown in FIG. 2.

As is apparent from FIG. 3, the blade 10 to be refurbished is inserted in a slot 50 and moved forward to an end stop 52 of the apparatus 100. The blade 10 is thereafter clamped by a clamping device 70 to a support surface 62 of a support member 60. Clamping device 70 comprises a threaded screw 72 in threaded engagement with an upper portion 64 of the clamping device 70 and a clamping plate 76. The threaded screw 72 is rotated by a handle 74 in one direction to push the plate 76 for clamping the blade to the support surface 62 and in an opposite direction to release the blade 10 from the clamping action. The clamping may alternatively constitute manual clamping.

The simplified and diagrammatic arrangement of FIGS. 4A-4F shows a pair of shearing tools, i.e. a punch 20 and a die 40 (see also FIG. 5) in the cutting apparatus 100, for cutting away a portion of the blade working end to thereby produce new sharp teeth.

The punch 20 and die 40 have mutually corresponding serrated shearing edges comprising cutting teeth 42. The pitch of the punch and die teeth 42 are twice the pitch of the blade teeth.

Figure 4A:
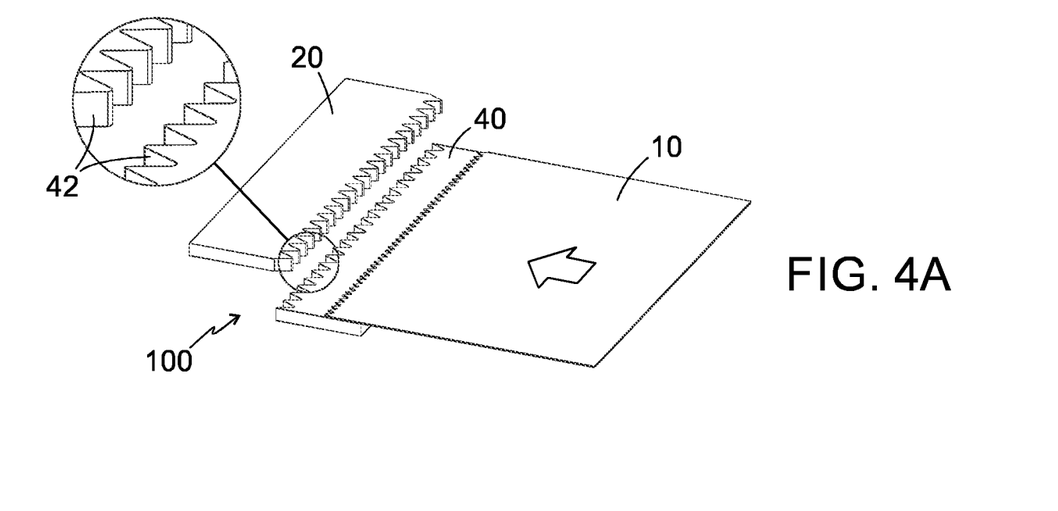
FIGS. 4A-F are diagrammatic slanting views illustrating steps in a simplified arrangement for performing a method according to the invention.
Figure 4B:
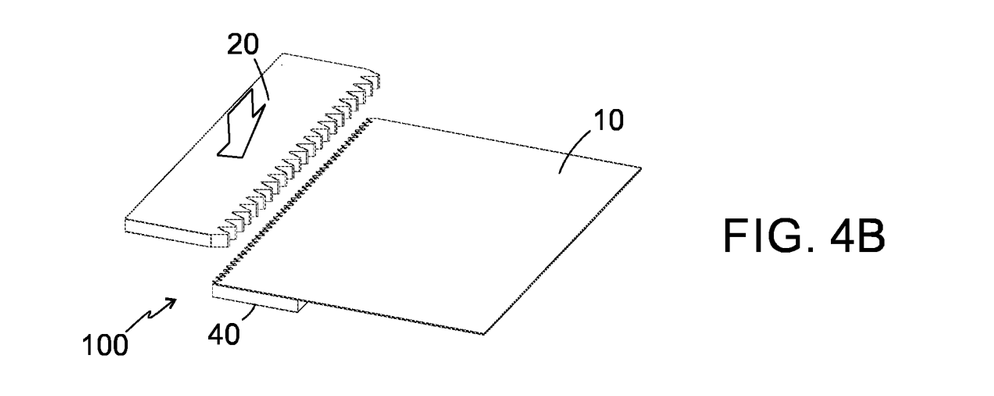
Figure 5:
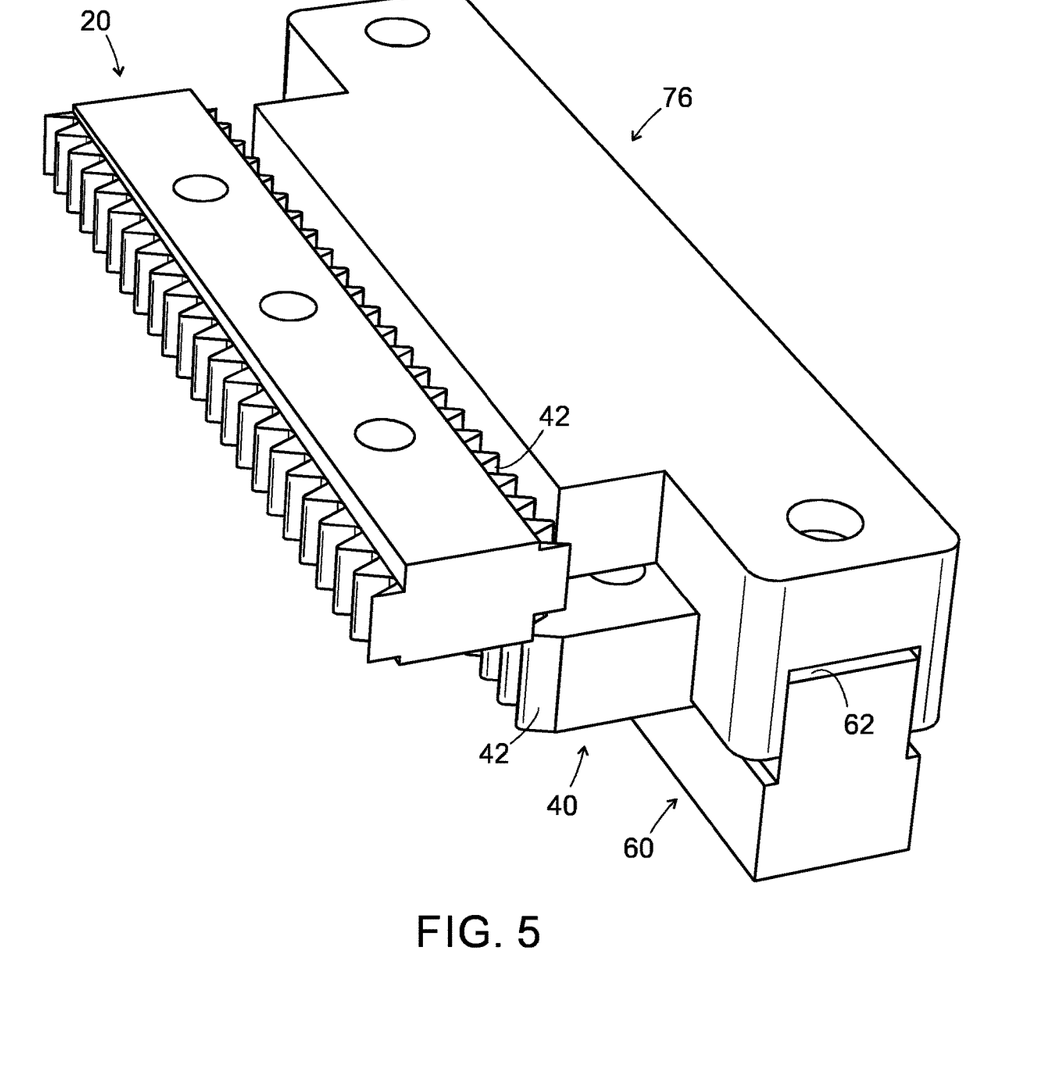
FIG. 5 is a perspective view of a punch and die arrangement according to the invention.

When the blade is fully inserted in the apparatus 100 as shown in FIG. 4B, the punch 20 is starting a first cutting action by moving downward.

Figure 2:
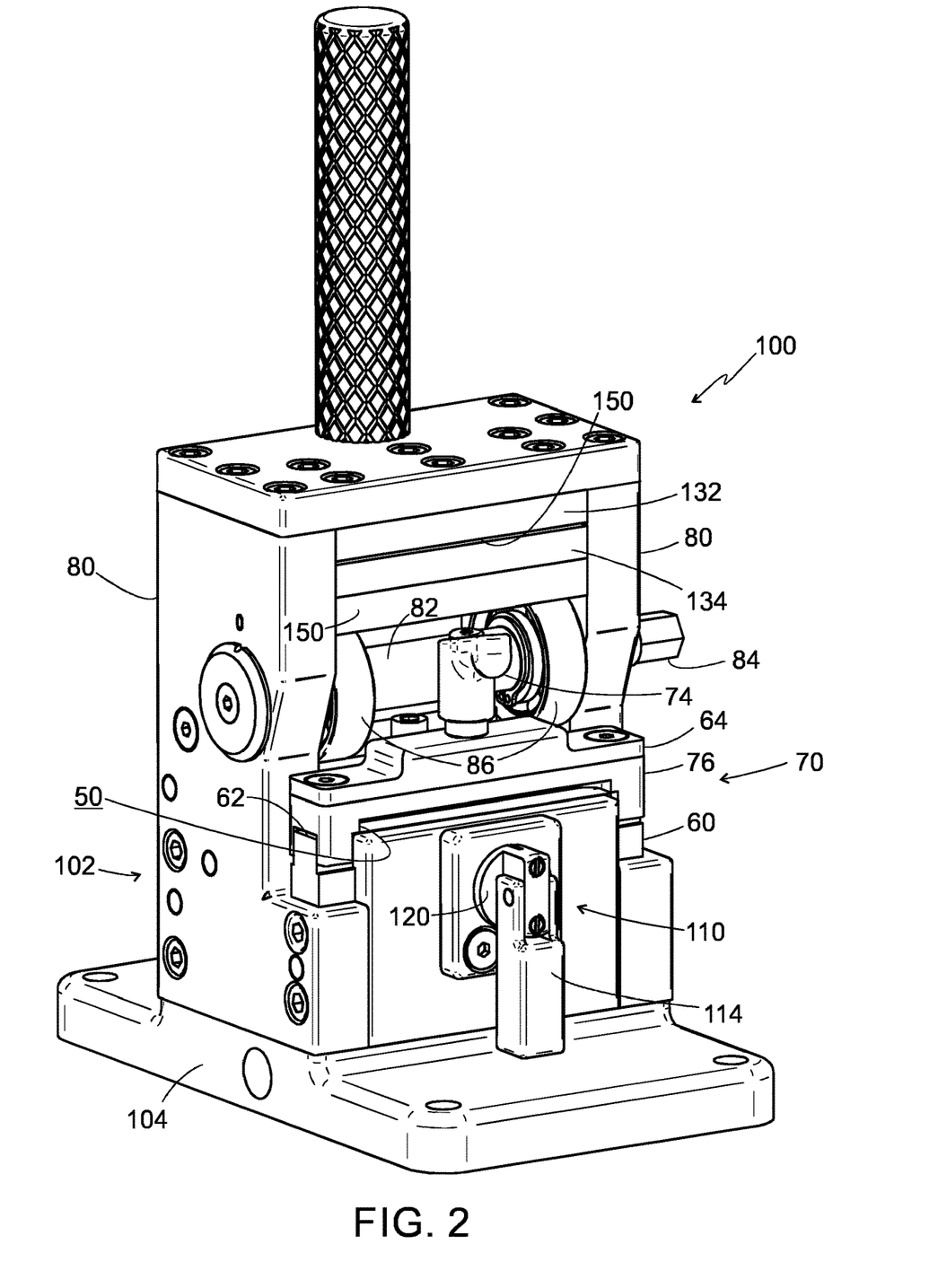
FIG. 2 is a slanting view of a cutting apparatus for refurbishing a blade according to FIG. 1.

In the FIGS. 2 and 3 embodiment, the downward movement is accomplished by an eccentric shaft portion 82 that, when rotated at a shaft end 84 by a wrench (not shown) or the like, pushes the punch 20 downward via a pair of ball bearings 86 to cut the blade 10. A rear end of a punch holder 22 (FIG. 3) is rotatably journaled to a support structure 102 comprising end plates 80 of apparatus 100 whereby the cutting is effected by a rotational movement. To obtain a smooth cutting action, a bottom face of the punch holder is resiliently supported by a stud 90 slidingly supported in the support structure 102 and counteracted by a helical spring 92 in turn supported by a bottom plate 104 of the apparatus 100.

Figure 4C:
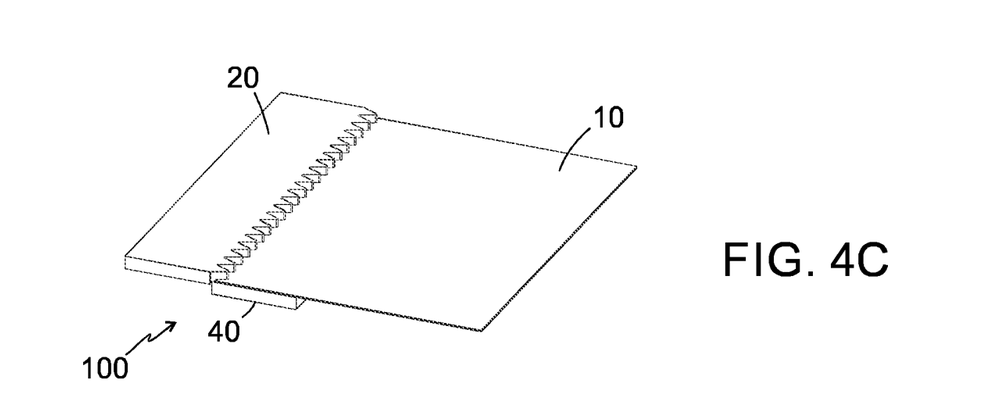

FIG. 4C illustrates the completion of the first cutting action. i.e. when the punch 20 has cut away the edge portion of the blade 10.

Figure 4D:
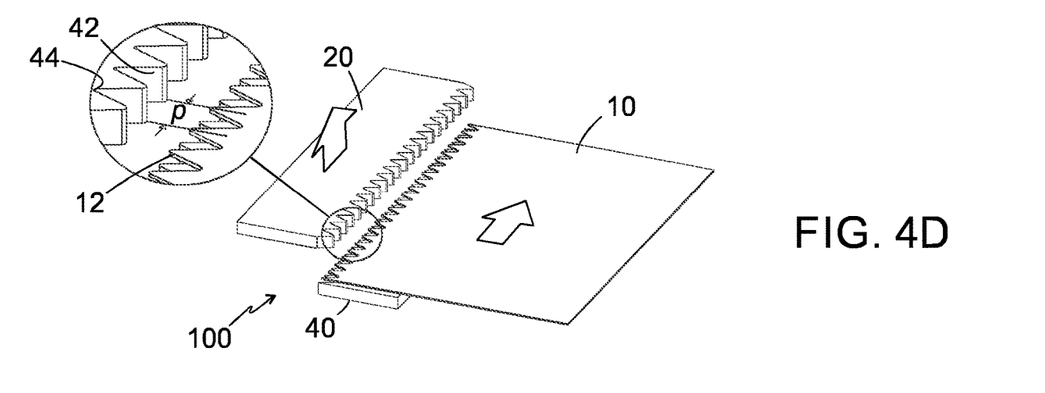

Thereafter, as shown in FIG. 4D, the punch is returned and the blade 10 is moved across the cutting direction a distance corresponding to half the pitch p of its new, temporary teeth 12. In this instance the blade teeth 12 have slightly rounded tips as a result of being cut by the inevitably slightly rounded bottoms 44 of the tips of the punch teeth 42.

Returning to FIGS. 2 and 3, this lateral movement of the blade 10 is accomplished by moving the support member 60 and the clamping device 70 laterally by a mechanism 110. The mechanism 110 comprises an eccentric end portion 112 of a shaft 113 journaled to the support structure 102 and rotated by a handle 114 to either one of two predetermined end positions defined by two releasable locking pins 118. The eccentric shaft end portion 112 is in engagement with a slot 116 having an inverted U-shape in the support member 60. The locking pins are supported axially slidable in a respective bore of a hub portion 120 connected to the handle 114 and have spherical heads that are resiliently forced into corresponding spherical depressions (not shown) in a support plate 124 mounted to the support structure 102.

Figure 4E:
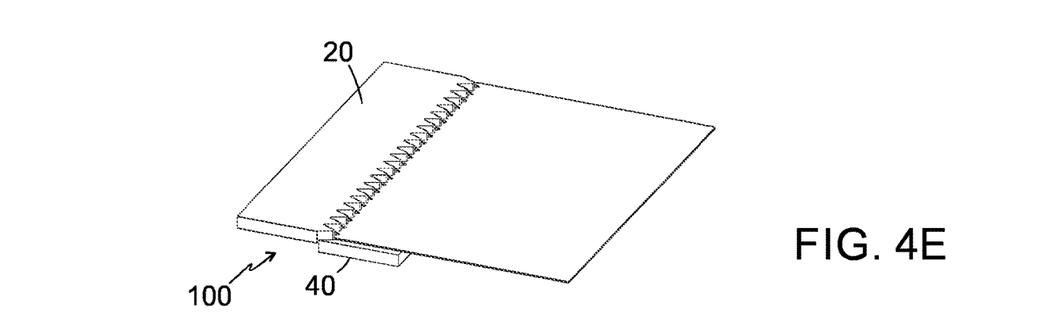
Figure 4F:
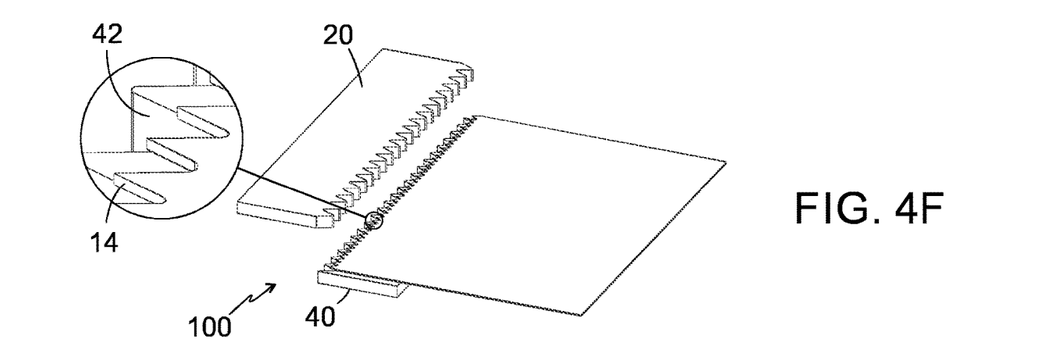

Accordingly, in the shown embodiment, the arrangement is such that on turning the handle 114 to one of the two end positions, the support member 60 and the clamping device 70 including the clamped blade 10 will be moved laterally to a corresponding releasably locked end position, such as that shown for the blade 10 in FIGS. 4D-F.

In that position the punch 20 is starting a renewed cutting action in the above described manner. Thereby, as is apparent from FIGS. 4D-F, the punch 20 will cut away the tips of the temporary teeth 12, thereby essentially increasing the total number of teeth twofold, and, most importantly, produce new teeth 14 with new "clean-cut" sharp tips, resulting from the two step cutting operation using intersecting straight edges of the punch and die.

As will be appreciated from the upper portions of FIGS. 2 and 3, the apparatus 100 of the shown embodiment also has a teeth setting device 130 incorporated therein.

Teeth setting device 130 has a pair of setting blocks: an upper stationary block 132 and a lower movable block 134. Lower block 134 is secured to a holder 150 that is rotatably journaled to the end plates 80 of the support structure 102 of the apparatus 100.

As can be understood from the enlarged circular area of FIG. 3, a slot 152 allowing insertion of a blade is defined between the blocks 132, 134. The blocks 132, 134 have serrated front edges corresponding to that of the blade to be set. The blocks 132, 134 also have teeth faces 133, 135 facing the blade and alternatively sloping upward and downward for bending the blade teeth correspondingly on operation of the setting device 130.

On operation, by rotating the eccentric shaft portion 20, the ball bearings 86 will push the holder 150 including the lower setting block 134 upward to effect the setting operation by bending the blade teeth in the described manner.

The foregoing detailed description is given primarily for clearness of understanding and no unnecessary limitations are to be understood therefrom. Modifications will become obvious to those skilled in the art upon reading this disclosure and may be made without departing from the scope of the appended claims.

The invention claimed is:

1. A cutting apparatus (100) for refurbishing an oscillating multi-tool blade (10) having a serrated forward end, the cutting apparatus (100) comprising:
   a clamping mechanism (70) including a clamping member (76) and a support member (60) for clamping the blade (10) therebetween;
   cutting tooling (20, 40) for cutting a new serrated end of the blade (10) by cutting away an edge portion of the serrated forward end; and
   a mechanism (110) for moving the clamping member (76) and the support member (60) and the blade (10) clamped therebetween across a cutting direction so far as tips of blade teeth (12) of the new serrated end will be cut away during a following renewed cut,
   said mechanism (110) comprising an eccentric end portion (112) of a shaft (113) journaled to a support structure (102) and rotated by a handle (114) to either one of two predetermined end portions defined by two releasable locking pins (118), wherein
   by cutting away the edge portion in two steps and moving the blade (10) laterally between the steps, where the blade (10) is clamped during this movement, tips of teeth resulting from the renewed cut will be very sharp as these are then not shaped by inevitably rounded tips of the cutting tooling (20, 40) but shaped in two occasions by intersecting straight edges of the cutting tooling (20, 40).

2. The cutting apparatus (100) of claim 1, wherein the cutting tooling (20, 40) comprises a punch (20) and a die (40).

3. The cutting apparatus (100) of claim 2, wherein the punch (20) is secured to a holder (22) rotatably journaled to the support structure (102) of the cutting apparatus (100).

4. The cutting apparatus (100) of claim 3, wherein a cutting stroke of the punch (20) is actuated by an eccentric rotating shaft portion (82) for pushing on the holder (22).

5. The cutting apparatus (100) of claim 4, wherein a rolling bearing (86) is mounted to the eccentric rotating shaft portion (82) for pushing on the holder (22).

6. The cutting apparatus (100) of claim 1, wherein the mechanism (110) for moving the clamping member (76) and the support member (60) and the blade (10) clamped therebetween further comprises an eccentric rotating shaft portion (82) of a shaft journaled to the support structure (102) of the cutting apparatus (100).

7. The cutting apparatus (100) of claim 1, further comprising a teeth setting device (130) comprising blocks (132, 134) having teeth faces (133, 135) facing the blade (10) and alternatively sloping upward and downward for bending the blade teeth (12) correspondingly on operation by clamping the blocks (132, 134) together.

8. The cutting apparatus (100) of claim 4, wherein the cutting tooling (20, 40) comprises a punch (20) and a die (40), the punch (20) is secured to a holder (22) rotatably journaled to the support structure (102) of the cutting apparatus (100), a cutting stroke of the punch (20) is actuated by an eccentric rotating shaft portion (82) for pushing on the holder (22), and the eccentric rotating shaft portion (82) can be used for clamping the blocks (132, 134) together.

9. A method of refurbishing an oscillating multi-tool blade (10) having a serrated forward end by use of the cutting apparatus (100) of claim 1, the method comprising steps of:
   clamping the blade (10) to the support member (60);
   cutting a new serrated end of the blade (10) by cutting away an edge portion of the serrated end;
   moving the blade (10) by the eccentric end portion (112) of the shaft (113) across a cutting direction so far as tips of the blade teeth (12) of the new serrated end will be cut away during a following renewed cut; and
   performing the renewed cut.

10. The method of claim 9, wherein the cutting is by shearing.

11. The method of claim 10, wherein the shearing is by rotation of a punch (20) past a die (40).

12. The method of claim 11, wherein the cutting is actuated by an eccentric rotating shaft portion (82) engaging the punch (20).

13. The method of claim 12, wherein the punch (20) is engaged by the eccentric rotating shaft portion (82) via a rolling bearing (86).

14. The method of claim 9, further comprising a step of setting the blade teeth (12) after performing the renewed cut, comprising insertion of the blade (10) into slot (152) between a pair of setting blocks (132, 134) of a teeth setting device (130), whereby the pair of setting blocks (132, 134) consist of an upper stationary block (132) and a lower movable block (134), wherein the lower movable block (134) is secured to a holder (150) that is rotatably journaled to end plates (80) of the support structure (102) of the apparatus (100), and wherein the pair of setting blocks (132, 134) have serrated front edges corresponding to that of the blade (10) to be set, wherein the pair of setting blocks (132, 134) also have teeth faces (133, 135) facing the blade (10) and alternatively sloping upward and downward for bending the blade teeth (12) correspondingly on operation of the teeth setting device (130), whereby on operation, by rotating the eccentric shaft portion (82), a rolling bearing (86) will push the holder (150) including the lower setting block (134) upward to effect a setting operation by bending the blade teeth (12).

* * * * *